C. W. GALLOWAY

March 29, 1932. Re. 18,403

METHOD OF AND MEANS FOR COOLING PASSENGER CARS IN STATIONS

Original Filed Sept. 8, 1930, 4 Sheets-Sheet 1

Inventor
Charles W. Galloway
By
Lawrence S. Clarkson
Atty

C. W. GALLOWAY

March 29, 1932. Re. 18,403

METHOD OF AND MEANS FOR COOLING PASSENGER CARS IN STATIONS

Original Filed Sept. 8, 1930 4 Sheets-Sheet 2

Inventor
Charles W. Galloway
By Evan S. Clarkson
Atty

C. W. GALLOWAY

March 29, 1932. Re. 18,403

METHOD OF AND MEANS FOR COOLING PASSENGER CARS IN STATIONS

Original Filed Sept. 8, 1930 4 Sheets-Sheet 3

Inventor
Charles W. Galloway
By Lewis S. Clarkson
atty

C. W. GALLOWAY

March 29, 1932. Re. 18,403

METHOD OF AND MEANS FOR COOLING PASSENGER CARS IN STATIONS

Original Filed Sept. 8, 1930 4 Sheets-Sheet 4

Inventor
Charles W. Galloway
By
Edwin S. Clarkson
Atty

Reissued Mar. 29, 1932

Re. 18,403

UNITED STATES PATENT OFFICE

CHARLES W. GALLOWAY, OF BALTIMORE, MARYLAND

METHOD OF AND MEANS FOR COOLING PASSENGER CARS IN STATIONS

Original No. 1,823,393, dated September 15, 1931, Serial No. 480,490, filed September 8, 1930. Application for reissue filed January 12, 1932. Serial No. 586,228.

This invention relates to a method of and means for temperature-conditioning the interiors of passenger vehicles, and particularly railway passenger coaches.

It is well known that railway cars parked in yards and in stations are uncomfortably hot inside during the summer months. This is especially true with reference to steel cars, and passengers entering the cars at stations awaiting the starting of the train are often extremely uncomfortable on account of the high temperature.

The primary object of my invention is to provide a method of and means for regulating the internal temperature of cars standing in a station or transportation yard so that passengers may remain in the car with comfort while awaiting the beginning of its travel.

Another object of the invention is to provide a method of and means for cooling the interior of a car whereby air may be properly cooled or conditioned on the exterior of the car by means mounted independent of the car and the car then cooled by the introduction thereinto of the cooled air and the withdrawal therefrom of the warm air until cooled to a desired temperature.

Still another object of the invention is to provide air cooling and introducing means of a portable type and adapted to be brought into operative position with respect to any car standing at a station or transportation yard whereby a passenger car of any type may be cooled within a short period of time, and which air cooling and introducing means is constructed to meet varying conditions of service.

The invention consists of the method and the steps thereof, and of the features of construction of an apparatus, as fully hereinafter described and set forth in the claims, and as shown in the accompanying drawings, of which:—

Figure 1:
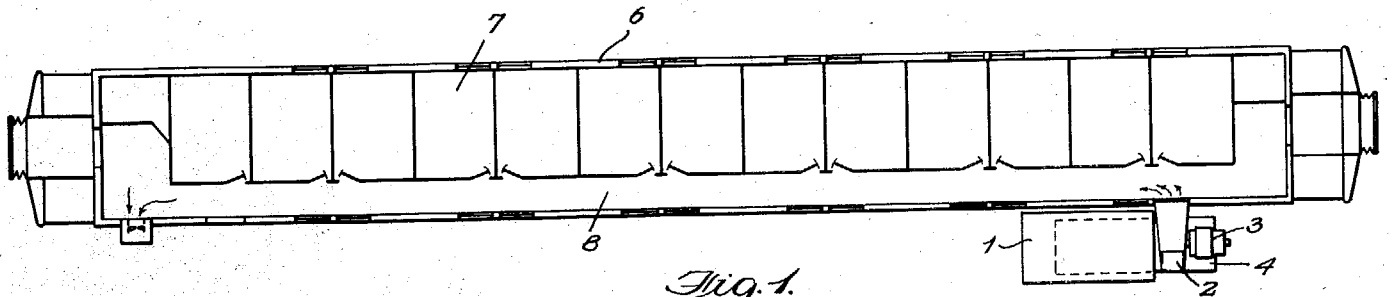
Fig. 1 is a sectional plan view of a railway passenger car, showing a portable conditioning apparatus embodying my invention as arranged in position for carrying out the method.

Referring now more particularly to Figs. 1 to 8, inclusive, of the drawings, 1 designates an air cooler or refrigerator, with which is associated a suction and blast fan or blower 2, driven by a motor 3 of electric or other suitable type. The parts 1, 2 and 3 provide an air cooling or conditioning apparatus which is mounted upon a wheeled truck 4, whereby it is rendered readily portable and movable along the floor or platform 5 of a railway station or the ground surface of a transportation yard for the purpose of conditioning air to be supplied to a standing passenger coach.

Figure 2:
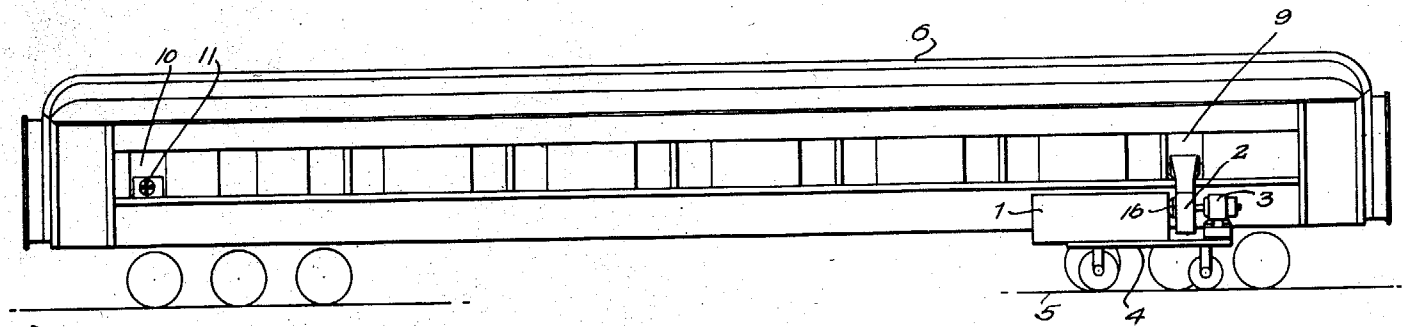
Fig. 2 is a view in side elevation of the same.
Figure 3:
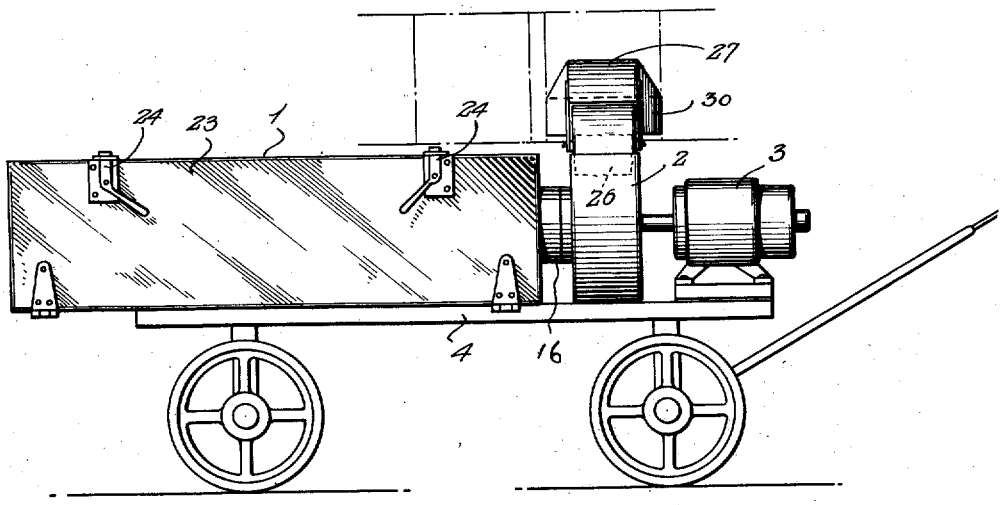
Fig. 3 is a view in side elevation of the apparatus on an enlarged scale and shown disposed in position for discharging cooled air into a car, the air inlet of the car being indicated in dot and dash lines.
Figure 4:
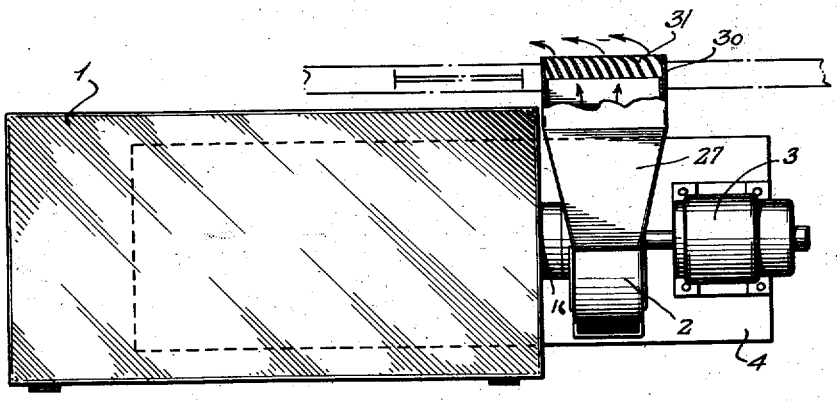
Fig. 4 is a top plan view of the apparatus shown in Fig. 3 with the spout nozzle and side of the car appearing in section.
Figure 5:
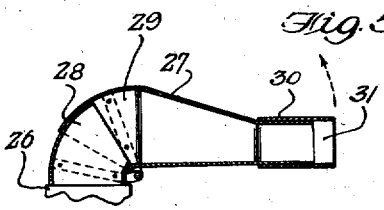
Fig. 5 is a vertical longitudinal section through the spout.
Figure 6:
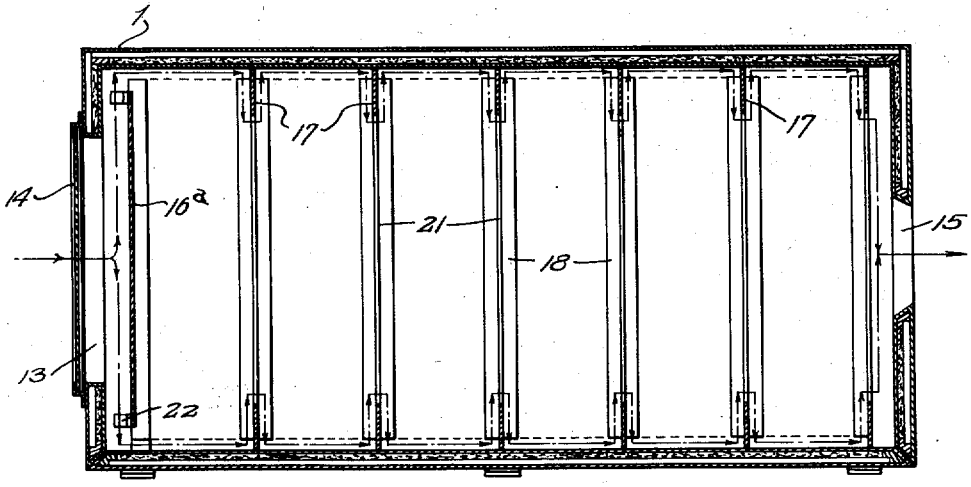
Fig. 6 is a sectional plan view of the air cooler or refrigerator.
Figure 7:
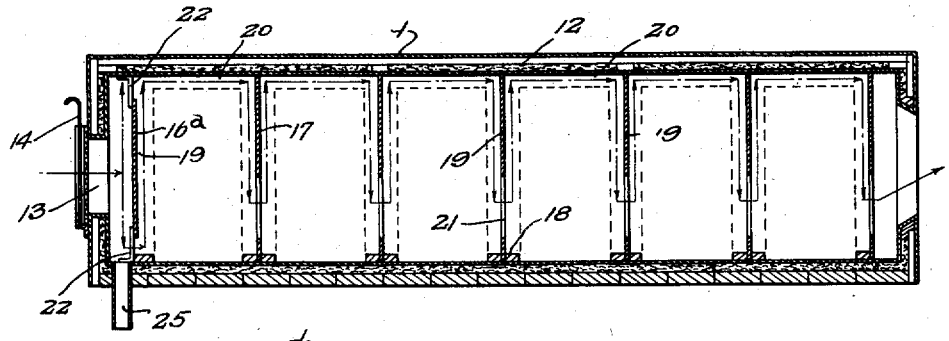
Fig. 7 is a vertical longitudinal section through the air cooler or refrigerator.
Figure 8:
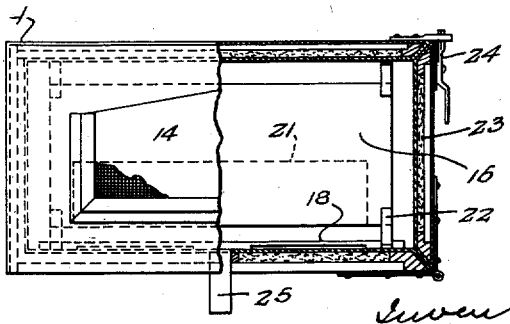
Fig. 8 is an end elevation of the cooler or refrigerator, partly broken away and in section.

Figs. 1 to 4, inclusive, of the drawings show the portable cooling apparatus as arranged alongside a coach 6 the interior of which is to be supplied with cool air therefrom for conditioning purposes. The coach illustrated more or less fully in Figs. 1 and 2 is of that type having a longitudinal row of sleeping compartments 7 arranged at one side of the car and leaving between the same and the other side a longitudinally extending aisle or passageway 8, but the invention is not limited to this type of car, as the method and apparatus may be employed for conditioning the interior of any style of passenger coach. However, in the type of car disclosed the aisle 8 is utilized as a passage for the supply of air to and its flow longitudinally to all portions of the interior of the car and the exhaust of warm air and partly cooled air until the temperature is reduced to the desired degree. The conditioned air from the air conditioning or cooling apparatus may be introduced into the aisle or passageway 8 at or near one end of the car through a window 9 employed as an inlet, and another window 10 at or near the opposite end of the car may be employed as an outlet for the exhaust of air from the interior of the car in the conditioning process. For the purpose of exhausting the air through the outlet 10 an electrically driven exhaust fan 11 may be used. Instead of using windows as in inlet and outlet a special inlet and a special outlet may be provided.

The cooler or refrigerator 1 comprises a preferably oblong rectangular casing or receptacle which is preferably of double walled type and provided with an insulating packing 12 between the walls or otherwise suitably constructed for the purpose of preventing cold losses. The casing or receptacle is provided at one end with an air inlet 13 controlled by a door, valve or damper 14, whereby said inlet may be closed or opened to varying degrees for the admission of air, and having at its opposite end a discharge opening 15 for the conditioned air which passes therefrom through a connection 16 to the intake opening of the casing of the fan or blower 2. Adjacent to the inlet 13 is arranged a vertical partition 16*a*, and disposed in spaced relation thereto and to each other between said partition 16 and the outlet end of the casing are other partitions 17 forming spaces or chambers to receive a cooling medium. The cooling medium employed may be of any sort but, in the constructional example shown, the chambers are preferably of a size to receive blocks of ice of 300 pounds weight, more or less, which are designed to rest upon the bottom or floor of the casing and to be held by retaining strips 18 in spaced relation so as to provide vertical air circulating passages 19 between the sides of each ice block and the adjacent partitions 17 and sides of the casing and connected by cross passages 20 between the tops of the blocks and the top wall of the casing. The partitions 17 are provided at their lower portions with openings 21 for the flow of air from chamber to chamber between passage 19 on opposite sides of each partition. The partition 16*a* differs from the partitions 17 in being devoid of an opening 21 and in being supported by brackets 22 so as to be spaced to provide passages at all sides between it and the walls of the casing, whereby said partition acts as a baffle to cause the air entering through the inlet 13 to be spread and to flow at top and bottom to the passages 19 and 20 of the first ice holding chamber. The air thus taken into the casing through the inlet 13 and delivered through the passages around the baffle or partition 16*a* to the near vertical passage 20 and top passage 21 of the first chamber travels over the surfaces of the ice block contained therein and then downward through the far vertical passage between the ice block and first partition 17, between the first and second chambers, and then upwardly and forwardly over the surfaces of the ice in the second cooling chamber, and so on throughout all the chambers of the cooler until it is discharged in suitably cooled or chilled condition through the outlet 15. It has been found in practice that by the use of a cooler or refrigerator of this type, air in large volume may be drawn thereinto and into the blower 2 by the suction of the latter and delivered by the blower to a car in properly chilled condition and in such volume that the internal temperature of the car may be reduced from a condition of very high temperature to a comfortably low temperature within a very short period of time. This construction of cooler or refrigerator is furthermore one that may be used anywhere in the stations or transportation yards of railway systems where ice is available, and provides a simple, economical and efficient type of cooler or refrigerator for the purpose.

For convenience in supplying blocks of ice to the cooler chambers one side wall of the cooler may be properly constructed and hinged to form a freely openable and closable door 23 adaptable to be held in closed position by suitable latches or fasteners 24. It has been found that blocks of ice disposed in the cooler chambers will melt uniformly, instead of melting to a greater degree at the top than at the bottom, and will thus preserve their normal regular shape as they become reduced in size, so that the relative ratio of cooling surface of portions of the blocks will remain the same, so that a reliable and efficient cooling action will always be maintained. The casing may be provided at its air intake end with a drain outlet 25 for the discharge of ice water, and the bottom of the casing may slope slightly between its outlet and inlet ends to facilitate the drainage off of the ice water, if desired.

The fan or blower 2 has its casing provided at its top with a cool air discharge outlet with which communicates the inlet end 26 of an air discharge spout 27. Such inlet end 26 of the discharge spout may if desired, be rotatably or oscillatably mounted in the outlet of the casing in order that the spout 27 may be swung or adjusted longitudinally of the truck and car to dispose the discharge spout at different horizontal working angles. The part of the spout body directly communicating with the inlet end 26 is preferably elbow shaped and comprises a pair of pivotally connected telescopic sections 28 and 29 adapting the spout to be vertically adjusted so as to dispose its discharge nozzle at different working elevations to compensate for variations between the floor or platform of the station or yard and the window or air inlet of the car into which the nozzle of the spout is to be inserted for the conditioning action. The spout nozzle 30 is preferably slidably or telescopically fitted upon the discharge end of the spout body so that the spout may be varied as to length to compensate for variations of position or distance between the chilling apparatus and the side of the car through which the nozzle is to be introduced. The shape of these parts of the spouts is also such that the nozzle may be reversed to properly dispose the vanes to adapt the nozzle for use at either the front end or the rear end of the car. The nozzle is divided internally by a plurality of vertically disposed vanes or louvers 31 into a desired number of discharge passages for breaking up the body of air delivered by the blast fan into horizontal line streams, and the vanes are set preferably at an oblique angle so as to discharge the streams of air at an angle into the aisle or passageway 8 toward the end of the car opposite that at which the spout is arranged and at which the exhaust fan 11 is arranged. The chilled or cooled air thus supplied to the interior of the car through the spout nozzle flows throughout the car and mingles initially with the warm air therein and cools all surfaces of the car while the originally warm air and eventually a certain proportion of the mixed air are being drawn off by the action of the exhauster 11, so that within a predetermined period the interior of the car will be filled with air at a desired low temperature. The car thus supplied with conditioned air will at the same time have its walls and contents reduced to such a temperature that after cessation of the conditioning operation the interior of the car will remain at a comfortable temperature, even in very hot weather, for a comparatively long period of time. Passengers entering conditioned cars of a train standing at a station will be kept comfortable during the standing of the train and the car walls kept cool for a considerable period after the car has started on its journey. By the use of conditioning apparatus of the character described at principal stations and points where train stops are made for any length of time, the cars may not only be conditioned before or after a train is made up, but also while a train in transit stops at a station, and the method of conditioning is such that the cool air supplied to the car will be introduced and the warm air exhausted without causing objectionable drafts.

This method of conditioning cars by introducing conditioned air into the car at one end and withdrawing the normal air from the car at the opposite end prevents the normal air within the car from becoming pressure bound and held from discharge, so that a quick and uniform conditioning is ensured.

Figure 9:
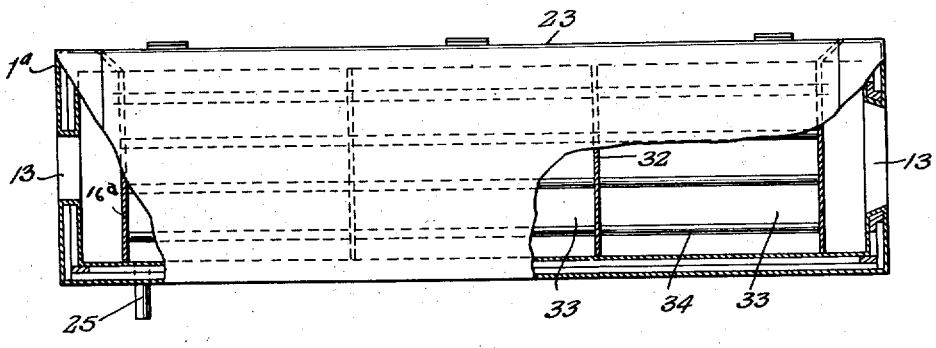
Figs. 9 and 10 are, respectively, a top plan view, partly in horizontal section, and a side elevation, partly in vertical section, of a modified form of air cooler or refrigerator.
Figure 10:
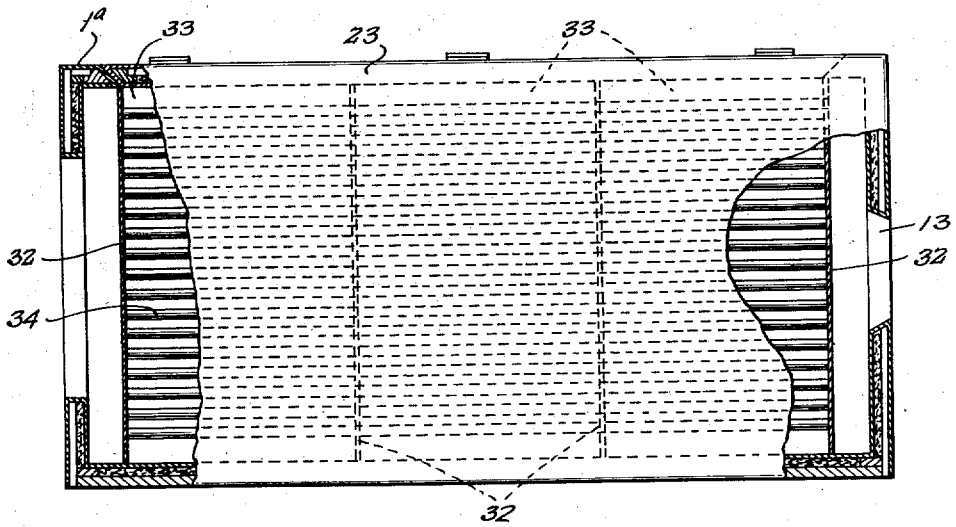

In Figs. 9 and 10 I have shown a construction of cooler or refrigerator 1*a* which is generally similar to the cooler 1 previously described except that in place of the ice block compartment forming partitions 16*a* and 17 partition plates 32 are employed which form chambers 33 for the refrigerant and supports for air cooling tubes 34 extending longitudinally of the casing and through which the air to be cooled passes between the inlet and outlet ends of the casing. The refrigerant used in this case may be broken or crushed ice, brine or other broken or crushed solid refrigerant or liquid refrigerant which chills the pipes or tubes and the air flowing therethrough. In other respects this cooler 1*a* may correspond with cooler 1 except that the door 23 is arranged at the top instead of at a side of the casing.

Having thus fully described my invention, I claim:—

1. The method of temperature-conditioning the interiors of passenger coaches while standing in a station or transportation yard, which consists in drawing air from the atmosphere outside the coach through a cooling course, cooling the air to a temperature lower than the internal temperature of the coach, forcing the cooled air into the coach at one end of the coach for travel in the direction toward the other end of the coach, and positively withdrawing the relatively warm air from the coach at the opposite end of the coach until a desired internal temperature condition is reached.

2. The method of temperature-conditioning the interiors of passenger coaches while standing in a station or transportation yard, which consists in drawing air from the atmosphere outside the coach through a cooling course, cooling the air to a temperature lower than the internal temperature of the coach, forcing the cooled air into the coach at one end of the coach in line streams for travel toward the opposite end of the coach, and positively withdrawing the relatively warm air from the coach at the opposite end of the coach until a desired internal temperature condition is reached.

3. An apparatus for temperature-conditioning railway passenger coaches standing in a station or transportation yard comprising a portable air cooler arranged for travel alongside the coach, a conductor for conducting the cooled air from the cooler to the interior of the coach, at one end thereof, means for drawing atmospheric air through the cooler and forcing the cooled air through said conductor, and means for positively withdrawing the relatively warm air from the coach at the opposite end of the coach.

4. An apparatus for temperature-conditioning railway passenger coaches standing in a station or transportation yard comprising a portable air cooler arranged for travel alongside the coach, a spout for conducting the cooled air from the cooler to the interior of the coach, said spout being adjustable to compensate for varying distances between the cooler and the coach, and means for drawing atmospheric air through the cooler and forcing the cooled air through said spout.

5. An apparatus for temperature-conditioning railway passenger coaches standing in a station or transportation yard comprising an air cooler arranged exteriorly of the coach, a spout for conducting the cooled air from the cooler to the interior of the coach, said spout being universally adjustable to compensate for varying distances between the cooler and coach, and means for drawing atmospheric air through the cooler and forcing the cooled air through said spout.

6. An apparatus for temperature-conditioning railway passenger coaches standing in a station or transportation yard comprising an air cooler arranged exteriorly of the coach, a spout for conducting the cooled air from the cooler to the interior of the coach, said spout being adjustable to compensate for varying distances between the cooler and coach and having vanes therein for directing the discharging air longitudinally of the coach, and means for drawing atmospheric air through the cooler and forcing the cooled air through said spout.

7. An apparatus for temperature-conditioning railway passenger coaches standing in a station or transportation yard comprising an air cooler arranged exteriorily of the coach, a device for drawing atmospheric air through the cooler and discharging the same under pressure, and a spout for receiving and conveying the cooled air from the same to the car, said spout having vanes for subdividing the air and discharging the same at an angle.

8. An apparatus for temperature-conditioning railway passenger coaches standing in a station or transportation yard comprising an air cooler arranged exteriorly of the coach, a device for drawing atmospheric air through the cooler and discharging the same under pressure, and a spout for receiving and conveying the cooled air from the same to the car, said spout being provided with a nozzle having vanes therein and adjustable to compensate for varying distances between the cooler and coach.

9. An apparatus for temperature-conditioning railway passenger coaches standing in a station or transportation yard comprising an air cooler arranged exteriorly of the coach, a device for drawing atmospheric air through the cooler and discharging the same under pressure, and a spout for receiving and conveying the cooled air from the same to the car, said spout being provided with a nozzle having vanes therein arranged at an angle to discharge the air in a direction longitudinally of the car and being reversible for use at either end of the car.

10. An apparatus for temperature-conditioning railway passenger coaches standing in a station or transportation yard comprising an air cooler arranged exteriorly of the coach, a device for drawing atmospheric air through the cooler and discharging the same under pressure, and a spout for receiving and conveying the cooled air from the same to the car, said spout being provided with an extensible nozzle having vanes therein arranged at an angle to discharge the air in a direction longitudinally of the car and being reversible for use at either end of the car.

11. The combination with a passenger coach having an air inlet and an air outlet in a side thereof, of air conditioning means arranged for travel alongside said coach, means carried by said conditioning means for introducing the conditioned air through the air inlet in the side of the coach into the coach, and means independent of said conditioning means for simultaneously exhausting air from the coach through the outlet in the side of the coach.

12. The method of temperature-conditioning railway passenger coaches, which consists in drawing air by suction directly from the atmosphere into one end of and through a cooling chamber located exteriorly of the coach, causing the air in its travel through the cooling chamber to flow in a circuitous path in direct contact with a plurality of surfaces of each of a plurality of successive blocks of ice disposed in spaced order therein, whereby the air is cooled to a predetermined degree, and discharging the cooled air at the opposite end of the cooling chamber and forcing such cooled air under pressure into the coach at or near one end thereof while discharging the relatively warm air from the coach at or near the opposite end thereof.

13. An apparatus for air conditioning railway passenger coaches comprising a portable truck, a cooling chamber carried by and extending longitudinally of the truck and adapted to be disposed therewith in parallel relation to a side of the coach and in proximity to an air inlet opening therein, said chamber having an air inlet at one end and an air outlet at its opposite end, means in said chamber for cooling the air to a predetermined degree between the inlet and outlet ends thereof, a flexible spout communicating with the chamber outlet and projecting laterally therefrom for engagement with the inlet opening in the car, and a suction and exhaust fan located at the outlet end of the chamber and operative for drawing air to be cooled by suction through the chamber and discharging the cooled air under pressure through said spout into the car through said inlet opening therein.

14. A portable apparatus for temperature-conditioning passenger coaches comprising a wheeled truck arranged for travel alongside the coach and to be disposed in parallel relation thereto, a cooling chamber extending longitudinally of the truck so as to be disposed therewith in parallel relation to the coach, said chamber having an inlet at one end and an outlet at its opposite end, a discharge spout communicating with the outlet end of the chamber for discharging cooled air therefrom into the coach through an inlet in the adjacent side of the latter, means in said chamber for holding a plurality of blocks of ice therein so as to form a circuitous cooling course, and whereby the air traveling through said chamber will be caused to pass over a plurality of surfaces of each block of ice in its course of travel, and a suction and exhaust fan disposed at the suction end of the chamber for drawing atmospheric air into said chamber at the inlet end thereof and through said chamber to the outlet end thereof and forcing the cooled air under pressure through said spout into the coach.

15. A portable apparatus for temperature-conditioning railway passenger coaches comprising a wheeled truck arranged for travel longitudinally of the coach and adapted to be disposed alongside the same and parallel therewith, a cooling chamber extending longitudinally of the truck and having an inlet at one end thereof and an outlet at the opposite end thereof, partitions disposed in said chamber between the top and bottom walls thereof forming a series of compartments for holding blocks of ice and having openings connecting the compartments at their lower ends whereby upflow and downflow air passages are formed in said chamber in communication at their upper ends with each other and at their lower ends with the passages of adjacent compartments for the up and down and cross flow of air successively in contact with a plurality of surfaces of each of the blocks, whereby the air is cooled to a predetermined degree, a discharge spout communicating with the outlet of the chamber and extending laterally therefrom for discharging the cooled air into the coach through an inlet in the side thereof, and a suction and exhaust fan located at the outlet end of the chamber for drawing atmospheric air into the chamber at the inlet end thereof and through said compartments and discharging the cooled air under pressure through said spout into the coach.

16. A portable cooler for temperature-conditioning railway passenger coaches comprising a truck arranged for travel alongside the coach and adapted to be disposed parallel therewith, a cooling chamber mounted on and extending longitudinally of the truck so as to be disposed therewith parallel with the coach, said chamber having an air inlet at one end and an air outlet at its opposite end, partitions in said chamber forming a series of communicating cooling compartments for holding blocks of ice therein, a door in said casing adapted when open to expose all of said compartments, a discharge spout at the outlet end of the casing, and a suction and exhaust fan at the outlet end of the casing and drawing atmospheric air into and through the casing and discharging the air under pressure from the outlet end of the casing into said spout.

17. In an apparatus for temperature-conditioning railway passenger coaches, a cooling chamber having an air inlet at one end and an air outlet at its opposite end and provided therebetween with compartments for holding blocks of ice, said compartments being formed by partitions arranged between the bottom and top walls of the chamber and provided with openings connecting the compartments at their lower ends, said partitions being spaced to form with the contained ice blocks air flow passages between the side and top surfaces of the blocks and adjacent surfaces of the chamber and partitions, a discharge spout communicating with the air outlet, and a suction and exhaust fan located at said outlet for drawing air longitudinally through the cooler and discharging the cooled air under pressure into said spout.

18. An apparatus for temperature-conditioning railway passenger coaches standing in a station or transportation yard, comprising an air cooler arranged exteriorly of the coach and adapted to be disposed in parallel relation therewith, said cooler embodying a cooling chamber having an air inlet at one end and an air outlet at its other end and partitions between said ends constructed and arranged to provide communicating compartments to hold blocks of ice and to form therewith upflow and downflow passages for causing the air to travel in a circuitous course in contact with said blocks, a spout extending laterally from the cooler at the outlet end thereof for conducting the cooled air therefrom to the interior of the coach, and means arranged at the outlet end of the cooler for drawing atmospheric air through the cooler and forcing the same under pressure through said spout.

19. In an apparatus for temperature-conditioning railway passenger coaches, a cooler operatively disposed alongside the coach to be cooled and embodying a cooling chamber having an air inlet at one end and an air outlet at its opposite end, means forming spaces for holding blocks of ice in spaced relation in said chamber between said inlet and outlet ends thereof, closure means adapted when opened to expose the ice holding spaces, a discharge spout extending laterally of the cooler and communicating with the outlet end of the chamber, and a suction and discharge fan located at the outlet end of the chamber for drawing atmospheric air through said inlet end into and through said chamber to said outlet end and forcing the cooled air issuing at the outlet end under pressure into the coach through the spout.

20. In an apparatus for temperature-conditioning railway passenger coaches, a cooler operatively disposed alongside the coach to be cooled and embodying a cooling chamber having an air inlet at one end and an air outlet at its opposite end, said chamber being partitioned to provide compartments for holding spaced blocks of ice, a discharge spout extending laterally of the cooler and communicating with the outlet end of the chamber, and a suction and discharge fan located at the outlet end of the chamber for drawing atmospheric air through said inlet end into and through said chamber to said outlet end and forcing the cooled air issuing at the outlet end under pressure into the coach through the spout.

21. The method of cooling passenger coaches, which consists in drawing atmospheric air by suction through a confined cooling course disposed outside the coach, subjecting the suction-drawn current of air in transit through the cooling course to the sequential cooling stages produced by the cooling actions of melting bodies of ice therein, and introducing the cooled air under pressure from the cooling course into the coach at a desired level between the window sill level of the coach and the top of the coach while simultaneously effecting discharge of relatively warm air from the coach at a desired level between the aforesaid levels.

22. The method of cooling passenger coaches, which consists in passing a suction-drawn current of atmospheric air through a cooling course outside the coach, artificially cooling the air in transit through the coarse, and introducing the cooled air under positive pressure into the coach at or near one end of the coach and at a desired level between the window sill level of the coach and the top of the coach while simultaneously discharging relatively warm air from the coach at or near the opposite end thereof and at a desired level between the aforesaid levels.

23. The method of cooling passenger coaches, which consists in drawing air from the atmosphere outside the coach through a cooling course having an entrance end, communicating directly with the atmosphere, and an exit end, by suction produced at the exit end of the course, cooling such air while in transit through the cooling course by sequential cooling stages produced by the cooling actions of a plurality of melting bodies of ice therein, and forcing the cooled air by pressure produced at the exit end of the course into the coach.

Signed at Baltimore, Maryland, this 8th day of January, 1932.

CHARLES W. GALLOWAY.